United States Patent
Fujioka et al.

(10) Patent No.: US 9,141,261 B2
(45) Date of Patent: Sep. 22, 2015

(54) SYSTEM AND METHOD FOR PROVIDING USER ACCESS

(75) Inventors: Robb Fujioka, Manhattan Beach, CA (US); Daniel Myahara, Manhattan Beach, CA (US); Justin Nishiki, Hawthorne, CA (US)

(73) Assignee: FUHU HOLDINGS, INC., El Segundo, CA (US)

( * ) Notice: Subject to any disclaimer, the term of this patent is extended or adjusted under 35 U.S.C. 154(b) by 1164 days.

(21) Appl. No.: 12/722,058

(22) Filed: Mar. 11, 2010

(65) Prior Publication Data

US 2010/0281408 A1 Nov. 4, 2010

Related U.S. Application Data

(60) Provisional application No. 61/209,974, filed on Mar. 11, 2009.

(51) Int. Cl.
*G06F 3/048* (2013.01)
*G06F 3/0481* (2013.01)

(52) U.S. Cl.
CPC .................................. *G06F 3/04817* (2013.01)

(58) Field of Classification Search
USPC ..................................................... 715/860, 861
See application file for complete search history.

(56) References Cited

U.S. PATENT DOCUMENTS

| | | | |
|---|---|---|---|
| 7,216,304 B1 * | 5/2007 | Gourdol et al. | 715/835 |
| 7,404,147 B2 | 7/2008 | Bell et al. | |
| 2006/0112354 A1 * | 5/2006 | Park et al. | 715/835 |
| 2007/0064004 A1 * | 3/2007 | Bonner et al. | 345/442 |
| 2008/0084389 A1 * | 4/2008 | Mac | 345/158 |

* cited by examiner

*Primary Examiner* — Thanh Vu
(74) *Attorney, Agent, or Firm* — Steptoe & Johnson LLP

(57) ABSTRACT

The present invention provides a system and method for providing a display, a graphical user interface rendered on the display having associated with it a plurality of objects representative of one or more computing functions, and a processor for varying the position of at least one of the plurality of objects, wherein the processor provides for the continuous repositioning of at least one of the plurality of objects.

26 Claims, 10 Drawing Sheets

SYSTEM AND METHOD FOR PROVIDING USER ACCESS

CROSS REFERENCE TO RELATED APPLICATIONS

This application claims the benefit under 35 U.S.C. 119(e) of earlier filed U.S. Provisional Patent Application 61/209,974, filed Mar. 11, 2009, entitled "System and Method for Providing User Access" with named inventors Robb Fujioka, Daniel Miyahara and Justin Nishiki, which application is incorporated herein as if set forth in the entirety.

FIELD OF THE INVENTION

The present invention is directed to an icon management system and, more particularly, to a graphical user interface for the representation of and interaction with one or more objects, and a method of making and using same.

BACKGROUND OF THE INVENTION

Existing operating systems (OS), graphical user interfaces (GUI), toolbars and docks are constrained in many ways, including at least because they have a rigidly structured layout and/or they are limited in the number of objects that they can represent in the available screen space. Further, the typical layout of icons in a computer environment generally restricts the icons to a certain portion of the display. For example, a typical arrangement of icons on a desktop of an OS would begin with restriction to the left quadrant of the screen, while a dock would be restricted to the lower portion of the display area. This restraint limits the number of icons which may be practically represented by the system and limits the ability of the user to easily, visually locate and access specific icons or objects.

Thus, there exists a need for an icon management system and, more particularly, to a graphical user interface and/or a graphical presentation of an OS for the representation of one or more objects, and a method of making and using same which may allow a user to more easily identify, organize and access system icons.

SUMMARY OF THE INVENTION

The present invention includes at least a graphical user interface for the display and selection of icons and objects associated with system accessible applications and information.

Thus, the present invention provides an icon management system and, more particularly, a graphical user interface and/or graphical OS for the representation of and interaction with one or more objects, and a method of making and using same.

BRIEF DESCRIPTION OF THE FIGURES

The present invention will be described hereinbelow in conjunction with the following figures, in which like numerals represent like items, and wherein.

DETAILED DESCRIPTION OF THE INVENTION

Figure 1:
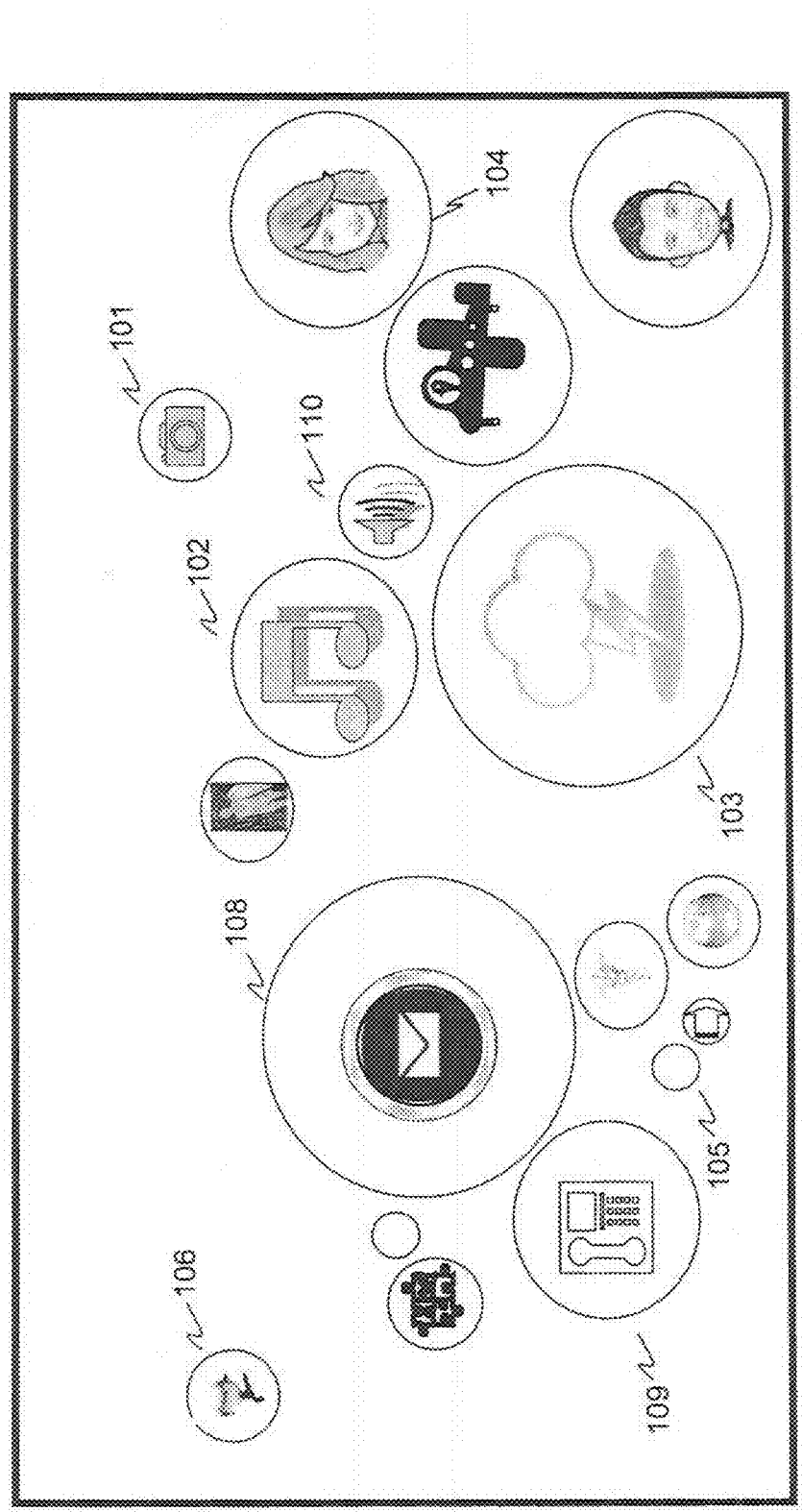
FIG. 1 illustrates an exemplary embodiment of the present invention.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

It is also to be understood that the figures and descriptions of the present invention have been simplified to illustrate elements that are relevant for a clear understanding of the present invention, while eliminating, for purposes of clarity, many other elements found in a typical system and method. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure herein is directed to all such variations and modifications to planning technologies known, and as will be apparent, to those skilled in the art.

The graphical user interface ("GUI") of the present invention provides a tool for the user of a computer to consolidate and access features provided by the computer, such as, for example: launching and managing applications; opening and managing running applications; accessing control functions between other computers and interfaces; navigating to uniform resource locators (URLs); and providing status and notifications on running processes and applications, including historical information. As such, the GUI of the present invention will be appreciated to provide graphical aspects of an OS in certain exemplary embodiments.

The GUI of the present invention is unrestricted as to layout and may accommodate any number of objects. As used herein, the term objects relates to the tiles, or icons, associated with a function, a collection of functions, or at least one piece of information. For example, an object may represent an application that allows a user to make phone calls via the internet. An object may also represent a downloaded file, such as a movie. By way of further example, an object may be a link to a mail program, either resident on the local system, attached via a USB port, or directly via the internet, for example. The objects may also be direct links to other sources of information or a conduit for instant communications. For example, an object may be linked such that information regarding the weather may be displayed once the object is activated. Similarly, an object may provide a direct communication link with a loved one, physician's office, and/or a web camera and microphone, for example. Similarly, an object may provide a link to other objects, such as sublevels of a hierarchical file system.

In an embodiment of the present invention, each object is represented by a circular "bubble". Each bubble may be generally rigid and may have an interactive skin whereby the user of the GUI may manipulate the size and characteristics of each bubble. Alternatively, each bubble may be somewhat deformable, such as when "grabbed" by a cursor or when abutted by another bubble or bubbles. The characteristics of the bubble may include its physical characteristics, such as color and texture, a symbol or picture denoting the action of the object, and/or the size of the object, for example. As illustrated in FIG. 1, the each bubble within the GUI may be represented by circular skin of a thickness appropriate to be seen by the user of the GUI and to facilitate the ability of user to interact with the bubble. Thus, the skin may be between approximately $\frac{1}{32}"$-$\frac{1}{4}"$ thick, by way of non-limiting example.

The frequency of interaction between the users of the system and a particular bubble may enlarge some bubbles of higher frequency interaction versus those bubbles with a lower frequency of interaction. Likewise, those bubbles deemed most "important" to the user may be correspondingly enlarged. In an exemplary embodiment of the present invention, the bubbles may be divided into three size categories based on the frequency of access or use of the bubble. For example, a medium, or middle, sized bubble indicates less usage than the largest bubble, while the smallest bubble indicates even less use. The size of the large, medium and small bubbles may be 1-4 cm, ½-3 cm, and ¼-2.5 cm, respectively, by way of non-limiting example.

The objects of the bubbles may also be of any graphic type and may denote to the user the action assigned to a particular bubble. For example, a bubble with a storm cloud graphic, as illustrated by bubble 103, may allow for the accessing of weather information located on a third-party system, such as weather.com, for example. The bubble 103 may not only allow for the user to access the linked information, but may also have associated with it user information such that, for example, the information initially retrieved from weather.com would include a forecast local to the user. This user information may be locally held, for example by a cookie or similar cache resident on the local or semi-local system, or retrieved from a third party site where a user's preferences and other information are stored. This locally held information may include dynamic bubble content such as preview content, that is continuously updated. Such continuous updates may occur using a periodic cycle, such as every five minutes or daily, for example, and/or may push the information to the dynamic bubble as the information contained with the host provider changes. Such information may include, for example, current weather conditions, forecasted weather, live video streams and content, current time, market information. This information may be pushed or pulled from the source of the information. The source of the information may be related to, or unrelated to, the underlying content of the bubble, for example. This may include having the current weather conditions displayed on the bubble for linking to weather.com, as discussed. This may also include having a metric of web usage displayed on the bubble for downloading video content. Further, the content for display on the bubble may be internally generated via the program associated with the bubble, or otherwise generated for display.

Figure 5:
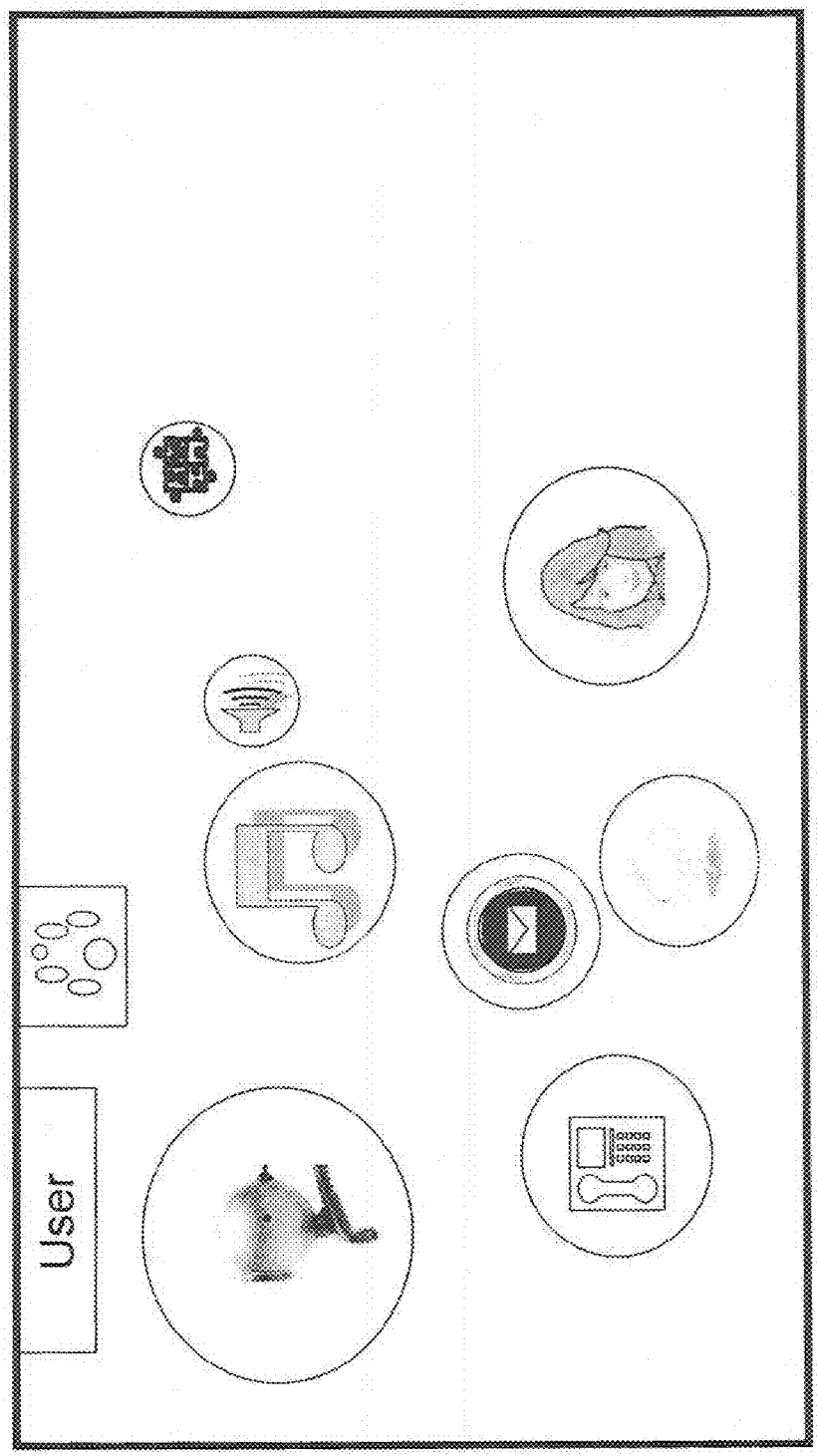
FIG. 5 illustrates an exemplary embodiment of the present invention.

The actions assigned to each bubble may also vary from initiating executable files to reorganizing certain system assessable functions and/or programs. For example, the bubble 104 in FIG. 1 may represent a particular user of the system and may provide the function of file organization. Thus, by activating the bubble, a user may be presented with a limited grouping or subgrouping of bubbles related to that user certain of which bubbles may be presented only upon accessing of a hierarchically superior bubble. As illustrated in FIG. 5, the user who had previously selected bubble 401 may be presented with a set of bubbles associated with the selected bubble. For example, the use denoted by bubble 104 may have associated with it bubbles 103, 106, and 108-111.

Figure 2:
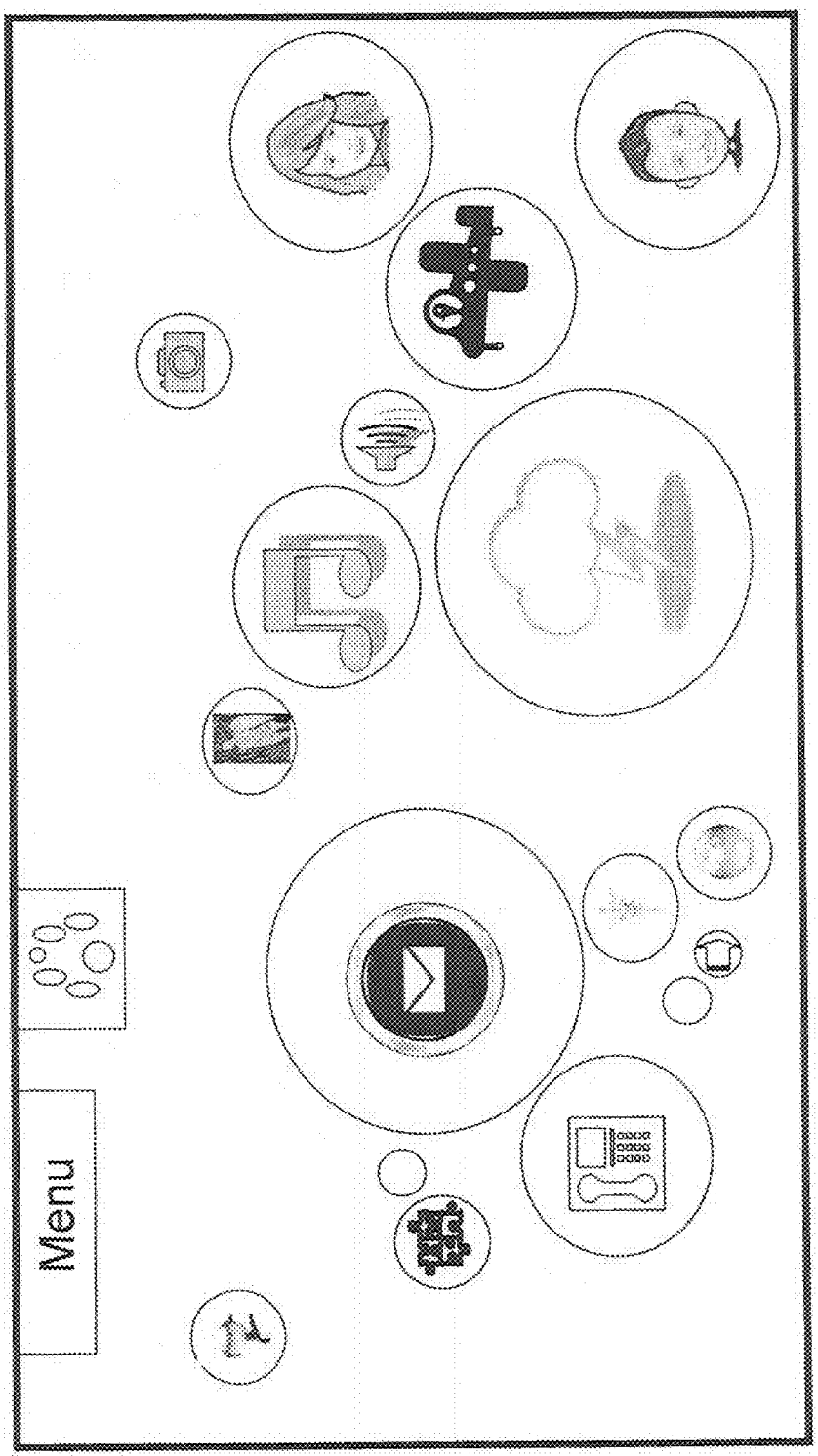
FIG. 2 illustrates an exemplary embodiment of the present invention.

As discussed above, the frequency of interaction between the users of the system and a particular bubble may enlarge some bubbles of higher interaction versus those bubbles with a lower frequency of interaction. Similarly, when a bubble is isolated through sorting or accessing, the bubble's relative size may change in accordance with the interaction of each bubble made by or through the sorted or accessed bubble. For example, as illustrated in FIG. 5, filtering by bubble 104 results in the displayed bubble 106 being larger the bubble 108: This may be contrasted with the relative sizes of bubble 106 and bubble 108 as illustrated in FIG. 2, for example. This may mean that for all of the users of the system, bubble 108 encountered the highest amount of interaction versus bubble 106. In each illustration, however, the relative size of each bubble may be predicated on the number of interactions with each bubble displayed by the GUI with the relative size of each bubble interdependent on all such interactions.

The associations between certain bubbles may be set by the user and may include factors such as frequency of use, user preferences, location usage, system requirements, system functionality, availability of peripherals, and connectivity, for example. Similarly, a bubble may include, for example, a graphic showing a desk with a light or a kitchen sink which may, respectively denote an "office" and a "kitchen." Each of these spaces may have associated with them a certain collection of bubbles that are desired to be used in those spaces. Regardless of whether linked to a particular user, space, and/ or function, the present invention allows for the filtering of system functions based on user and system defined associations.

In an exemplary embodiment of the present invention, the bubbles may be in motion, or in a constant state of motion, and may move in a random direction until they come into contact with another bubble or edge of the screen, or another pre-set boundary. The reaction of the bubbles from a collision with another bubble or edge may be similar to that of billiards balls. Although the mathematics behind the relative action of objects in a "billiards" format is well known to those skilled in the art, a sample of various particulars associated with the present invention is included in the code herein, and as will be indicated therefrom to those skilled in the art.

A collision check is done whenever the calculations that control the action of the bubbles are recalculated. In an embodiment of the present invention, the calculations are recalculated each time the GUI is refreshed, which may be optimally set at 42 frames per second. Of course, the refresh rate may be reduced or increased depending on the capabilities of the system that is running the GUI and the resulting look at utility of the GUI. The collisions between bubbles and boundaries follows the nature of elastic collision; the directions of velocity after collision are tangent lines based off the line of collision and the line of intersection of the two objects. This calculation may be done in the following manner, without limitation:

```
package org.cove.ape {
   internal final class CollisionResolver {
      internal static function resolveParticleParticle(
         pa:AbstractParticle,
         pb:AbstractParticle,
         normal:Vector,
         depth:Number):void {
            // a collision has occured. set the current positions to sample locations
            pa.curr.copy(pa.samp);
            pb.curr.copy(pb.samp);
            var mtd:Vector = normal.mult(depth);
            var te:Number = pa.elasticity + pb.elasticity;
            var sumInvMass:Number = pa.invMass + pb.invMass;
            // the total friction in a collision is combined but clamped to [0,1]
            var tf:Number = clamp(1 - (pa.friction + pb.friction), 0, 1);
            // get the collision components, vn and vt
            var ca:Collision = pa.getComponents(normal);
            var cb:Collision = pb.getComponents(normal);
            // calculate the coefficient of restitution based on the mass, as the normal component
            var vnA:Vector = (cb.vn.mult((te + 1) * pa.invMass).plus(
               ca.vn.mult(pb.invMass - te *
pa.invMass))).divEquals(sumInvMass);
            var vnB:Vector = (ca.vn.mult((te + 1) * pb.invMass).plus(
               cb.vn.mult(pa.invMass - te *
pb.invMass))).divEquals(sumInvMass);
            // apply friction to the tangental component
            ca.vt.multEquals(tf);
            cb.vt.multEquals(tf);
            // scale the mtd by the ratio of the masses. heavier particles move less
            var mtdA:Vector = mtd.mult( pa.invMass / sumInvMass);
            var mtdB:Vector = mtd.mult(-pb.invMass / sumInvMass);
            //add the tangental component to the normal component for the new velocity
            vnA.plusEquals(ca.vt);
            vnB.plusEquals(cb.vt);
            if (! pa.fixed) pa.resolveCollision(mtdA, vnA, normal,
               depth, -1, pb);
            if (! pb.fixed) pb.resolveCollision(mtdB, vnB, normal,
               depth, 1, pa);
         }
         internal static function clamp(input:Number, min:Number,
max:Number):Number {
            if (input > max) return max;
            if (input < min) return min;
```

In an embodiment of the present invention, the friction constant for the bubbles may be held at zero with an assigned mass of 1, regardless of the size of the object. Using these variables, all objects, regardless of size, may act uniformly under the same conditions. Similarly, when a collision occurs, elasticity may be what affects the resulting "bouncing" velocity on both of the colliding objects. In an embodiment of the present invention, the border or edge elasticity may be approximately 0.5 with the bubble elasticity at approximately 0.3, by way of non-limiting example. The elasticity may be combined during a collision and used to calculate the coefficient of restitution for the resulting velocity. The calculation may be done as illustrated below, without limitation:

```
//ca.vn = vector normal of collision for object A
//cb.vn = vector normal of collision for object B
//pa = object A
//pb = object B
//te = combined elasticity
// calculate the coefficient of restitution based on the mass, as the normal component
      var vnA:Vector = (cb.vn.mult((te + 1)).plus(ca.vn.mult(1-
te))).divEquals(1);
      var vnB:Vector = (ca.vn.mult((te + 1)).plus(cb.vn.mult(1 -
te))).divEquals(1);
```

Further still, the present invention may utilize the effect of damping to provide the illusion of "friction to the surface", although there is no friction applied to the objects. In an embodiment of the present invention, the damping value may be multiplied to every object's velocity during every update and may have a value of 0.97, by way of non-limiting example. Additionally, when a bubble is in motion damping may be applied to slow the bubble down. However, when the bubble's velocity slows to lower than the pre-set minimum velocity the object may retain its previous higher velocity. In an embodiment of the present invention, the minimum velocity of the bubbles may be 0.8 in any direction, without limitation. The limit for the minimum velocity may be set in the following way, by way of non-limiting example:

```
public class DragableCircleParticle extends CircleParticle {
   private var mouselsDown:Boolean;
   private var timestamp:Date;
   private var old_velocity_x:Number =.1;
   private var old_velocity_y:Number = .1;
   public var foreverMove:Boolean = true;
   public var magnetOn:Boolean = false;
   public function DragableCircleParticle(
         x:Number,
         y:Number,
         radius:Number,
         fixed:Boolean = false,
         mass:Number = 1,
         elasticity:Number = 0.0,
         friction:Number = 0){
      super(x, y, radius, fixed, mass, elasticity, friction);
      alwaysRepaint = fixed;
      mouselsDown = false;
```

-continued

```
        sprite.addEventListener(MouseEvent.MOUSE_DOWN,mouseDownHandler);
        sprite.stage.addEventListener(MouseEvent.MOUSE_UP,mouseUpHandler);
        sprite.stage.addEventListener(MouseEvent.MOUSE_MOVE,mouseMoveHandler);
        sprite.doubleClickEnabled = true;
    }
    private function mouseClickHandler(e:MouseEvent):void
    {
    }
    private function mouseDownHandler(evt:MouseEvent):void
    {
        if (fixed == false)
        {
            mouseIsDown = true;                  // on mouse down set mouseIsDown to true
            curr.setTo(evt.stageX,evt.stageY);   // set the current position of the particle to the position of the mouse
            prev.setTo(evt.stageX, evt.stageY);  // set the previous position of the particle to the position of the mouse
        }
    }
    private function mouseUpHandler(evt:MouseEvent):void
    {
        mouseIsDown = false;                 // on mouse up set mouseIsDown to false
    }
    private function mouseMoveHandler(evt:MouseEvent):void
    {
        if(mouseIsDown)
        {                                    // On mouse move if the mouse is down
            prev.copy(curr);                 // set the previous position to the curent position of the particle
            curr.setTo(evt.stageX,evt.stageY); // set the current position to the position of the mouse
        }
    }
    public override function update(dt2:Number):void {
        i(!mouseIsDown)
        {                                    // Don't update if the mouse is down
            if (velocity && magnetOn)
            {
                velocity = new Vector((1024/2)-px,(600/2) - py).normalize( );
                velocity = new Vector(velocity.x * 3, velocity.y * 3);
                super.update(dt2);
                old_velocity_x = px;
                old_velocity_y = py;
            }
            else
            {
                super.update(dt2);
                if(velocity && foreverMove)
                {
                    if( (velocity.x > .08 || velocity.x < -.08) && (velocity.y > .08 || velocity.y < -.08) )
                    {
                        old_velocity_x = velocity.x;
                        old_velocity_y = velocity.y;
                    }
                    else
                    {
                        velocity = new Vector(old_velocity_x+(old_velocity_x*.1),old_velocity_y+(old_velocity_y*.1));
                    }
                }
            }
        }
    }
}
```

Additionally, the present invention, as described above, may allow for the controlled manual movement of the bubbles by a user of the GUI. If a user drags a bubble around the display area, a new velocity may be calculated through each frame until the bubble is released. In accordance with the calculation features above, the speed by which a user drags a bubble around the display area may directly impact the velocity of the bubble upon release. Further, during the dragging process, damping may be deactivated to allow for the smooth movement of the bubble. Once released from the user's control, damping may once again be applied to the bubble.

```
// ca.vt = tangental component for object A
// cb.vt = tangental component for object B
// add the tangental component to the normal component for the
new velocity
    vnA.plusEquals(ca.vt);
    vnB.plusEquals(cb.vt);
```

In an exemplary embodiment of the present invention, the GUI may be is used with a touch screen sensitive display device. A touch screen may be of any practical size and may range from large wall hung displays to personal media devices. The touch activation of the bubbles may not differ from the interaction achieved using a standard cursor. For example, by touching and holding a particular bubble, the bubble may respond and more about the display without launching its associated function. To launch the function associated with the bubble, the user may tap or click, once or twice, in quick succession, as would be known to those skilled in the art. Similarly, a single or double tap or click on or about the area of the skin of the bubble may allow the user to access the characteristics of that individual bubble.

Further, the real-time connection between the touch interface and a bubble may be controlled, such as by selecting preferences in the interaction of the bubble via a user input device. The selecting of preferences may include a bubble staying connected to the finger that is moving the bubble, while still interacting with the rest of the bubbles as described hereinthroughout. Gestures of the finger may also be used to enable the movement of a bubble and/or bubbles, such as by flicking the bubble away upon release to provide more velocity and a direction to the movement of the correspondent bubble. Additional interactions with the touch screen may include flicking, stopping, relocating, and changing the size of the bubble, such as by grabbing at opposite edges and pulling outward to expand the size or pushing inward to decrease the size.

The number of objects which may be handled by the GUI is limitless. The amount of objects which may be presently so as to be reasonably seen and utilized by a user may depend on the user's cognitive abilities, the characteristics of the display, such as size and brightness, and the relative capacity of the system engaged in supporting the GUI. For example, on an average 15" display, the number of visible bubbles may range from approximately 1-50. Further, the use of split screens, borderless displays, and hierarchical organization may increase the number of objects in the same example. By way of further example, the use of at least two displays for one GUI may allow for at least a doubling of the objects able to be presented. Similarly, the use of at least two displays and at least two GUIs which are interconnected with the ability to share at least one object may provide a multiple fold increase in the number of objects which may be readily handled.

The use of a "borderless" display may also increase the number of usable objects by allowing certain objects to move out of the visible display area. The action of the bubbles out of the viewable area may be controlled in various ways. For example, a border which behaves the same as the standard viewable boarder, i.e., one in which the bubbles ricochet off from, may be placed a certain distance out of the viewable area and may be retain the shape of the actual display area or may be varied on at least one side. For example, the off screen boarder of a display may be set at 4 inches outside each respective side of the visible display. Alternatively, the top border may be set at 8" while the remaining sides are left in line with the visible area. As discussed further herein, off-screen bubbles may be recalled through filtering and other recall methods.

The ricochet action of the present invention may be partially or fully disabled. For example, one or more borders may be made neutral and/or sticky regardless of whether or not the ricochet characteristics of the bubbles are changed. Similarly, at least one bubble may be made neutral and/or sticky to allow for organizational preferences and increased control. For example, a sticky border may allow for a user to more easily select a bubble once the bubble is statically attached. Similarly, a bubble may be released from a sticky border by turning off the border stickiness or moving the bubble away from the sticky border, for example. Further still, neutral and/or sticky bubbles may provide increased control by the user over the objects provided by the GUI, in various ways, such as by allowing for the limiting of the ricochet effect.

Figure 3:
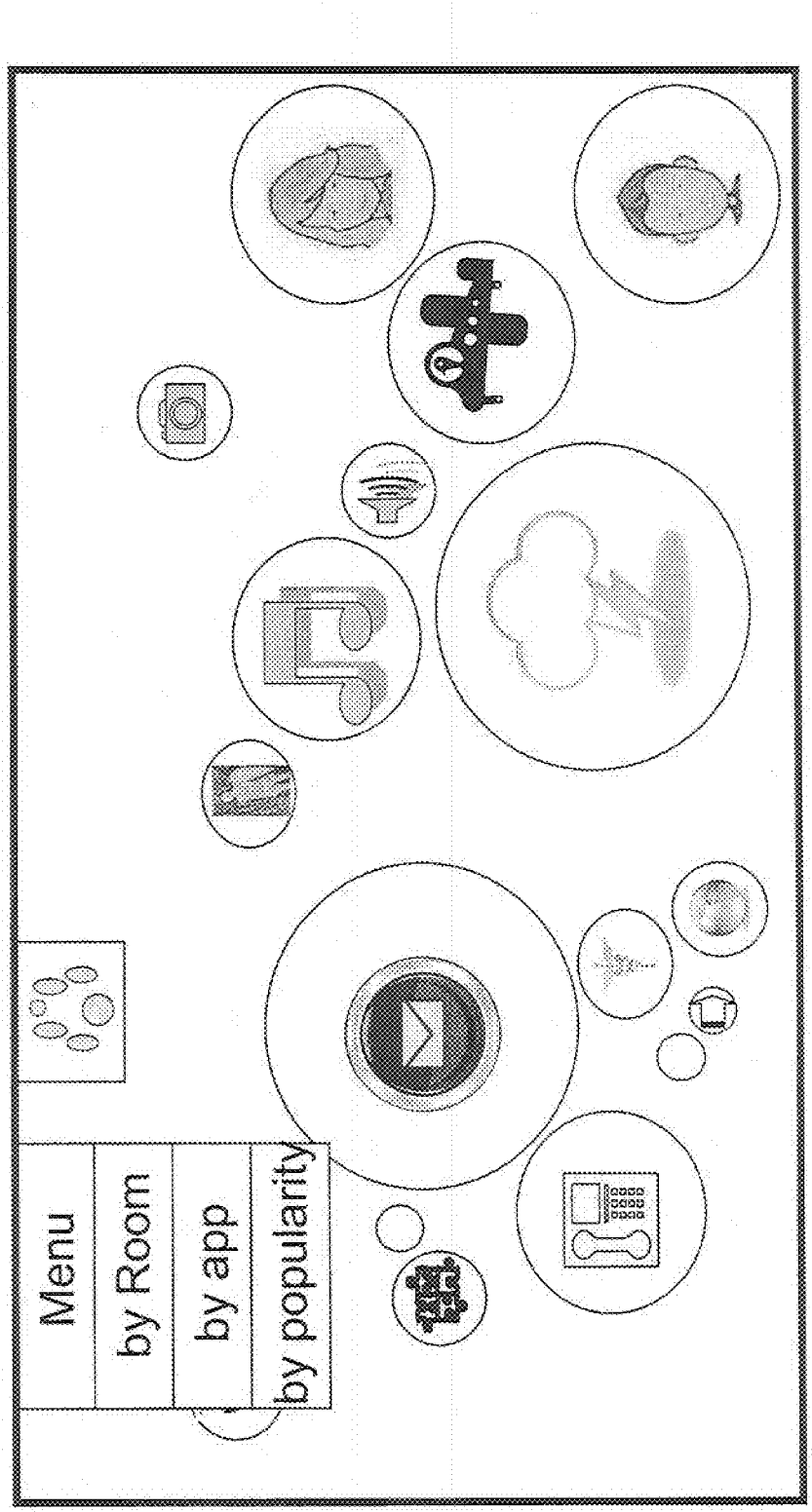
FIG. 3 illustrates an exemplary embodiment of the present invention.
Figure 4:
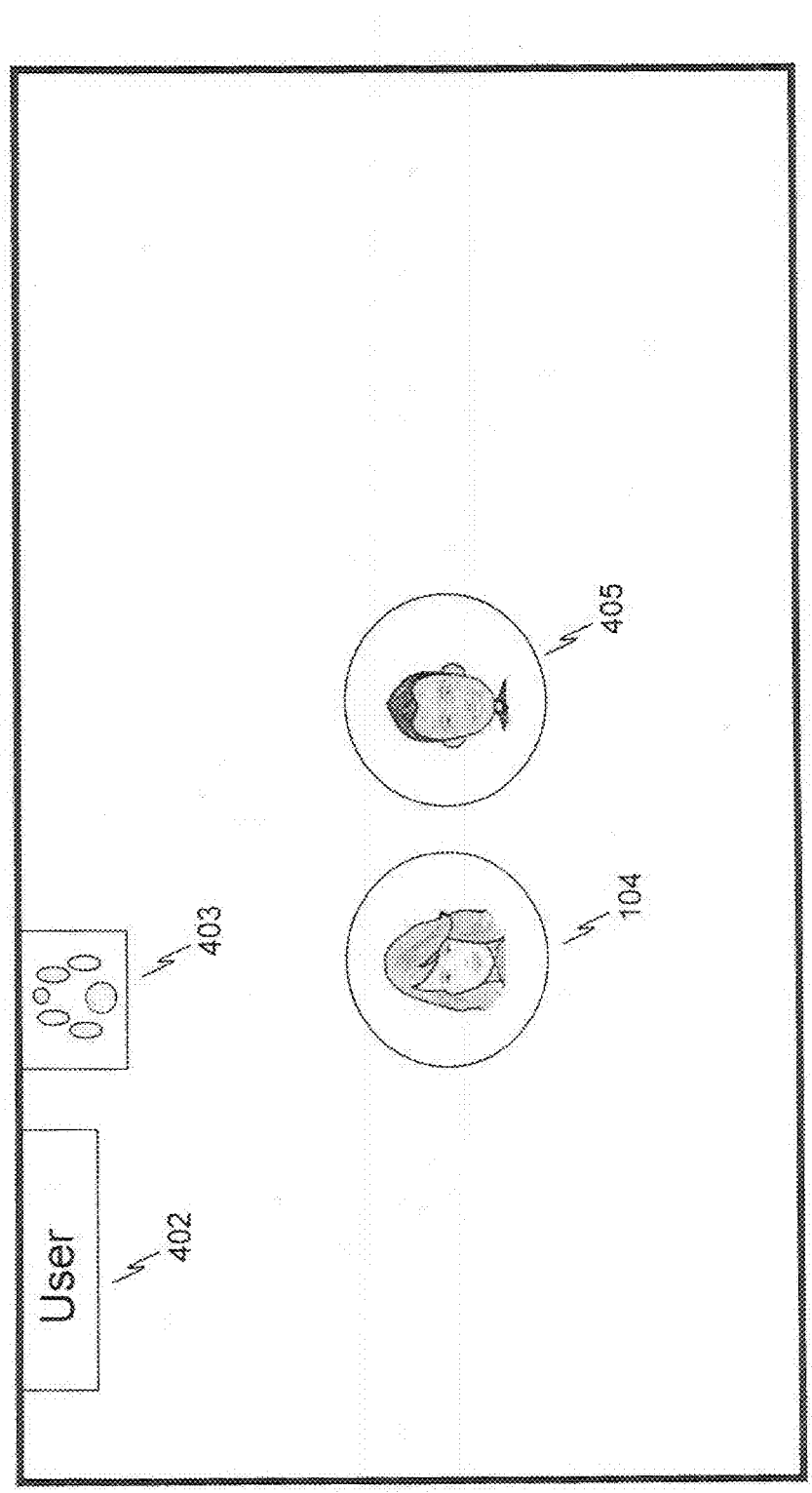
FIG. 4 illustrates an exemplary embodiment of the present invention.

As illustrated in FIG. 3, menus may be provided by the present invention for sorting, filtering, and arranging the bubbles. For example, the menu drop-down may provide the ability to filter the bubbles as they are assigned by the user. In the illustrated instance, the bubbles may be assigned to specific room type assignments, by applications and/or application types, and by popularity, for example. Choosing one of the presented menu options may sort and present a limited number of objects to the user. As illustrated in FIG. 4, the selecting of the "user" menu offering 402 may provide for display and interaction of only those objects that identify specific users. For example, bubbles 104 and 105 may represent two user objects. Each user object may have associated therewith at least one other object within the system. For example, by selecting the bubble 104, the objects associated with the user represented through bubble 104 may be presented as illustrated in FIG. 5.

As further illustrated in FIG. 5, and as discussed above in greater detail, the bubbles associated with user as depicted in bubble 104 may be representative in size correlative to the frequency of use and/or access by that particular user. By way of non-limiting example only, the user filtered display illustrated in FIG. 5 illustrates a relative higher frequency accessing of bubble 106 by the selected user than by other users of the system, as illustrated by FIG. 1. Although the system may assign a certain subset of objects to be associated with a user, for example, the user may define the criteria and or specific objects which may be associated. For example, although the user illustrated in FIG. 5 may access more of the system objects than the objects shown, a limitation on the filtering of objects may present bubbles associated with the user that the user has accessed a minimum amount of times in a given time period, for example. By way of further example, the user illustrated in FIG. 5 may have accessed the objects displayed at least a minimum of 10 times in the last month, for example.

Figure 6:
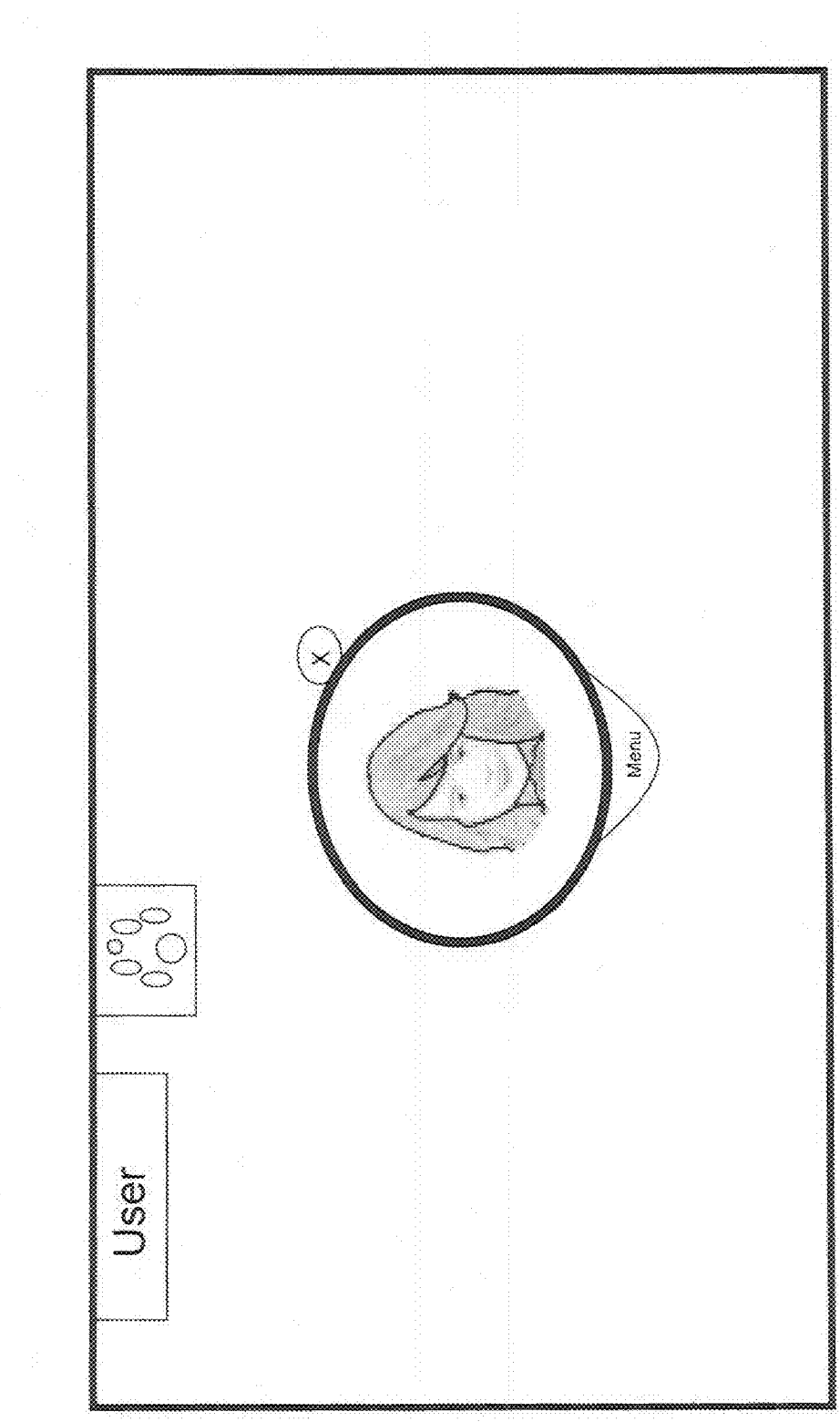
FIG. 6 illustrates an exemplary embodiment of the present invention.

The present invention may also allow for users of the system to keep and control personal user information which, as described further herein, may allow for a more tailored experience of the present invention by the user. As illustrated in FIG. 6, the user menu may allow for the accessing of a user's object, such as to change and input various information ranging from system preferences to social networking data to passwords and bookmarked URLs. As would be known by those skilled in the art, any range of information which may have use associated with a user of the present system may be accessed through the interface illustrated in FIG. 6.

As discussed herein, the embodiments may be directed to bubble interaction using billiard ball physics, user defined fixed placement, automatic fixed placement and/or based on an attribute. Attribute based alignment or interaction may include alphabetical, most recently used, most used and the like and may have orientations such as from A to Z across the screen, from A to Z from top to bottom, and/or other orientations. Further, the most used bubbles may be placed in the middle of the screen, and may extend there from in opposite directions as the amount of use of the bubble decreases. This type of configuration may provide advantages, such as when all of the bubbles fail to fit on the display screen at the same time. Having the most used in the center of the display may provide user convenience in accessing the bubbles not in view, and may require lesser used bubbles to be shifted in order to access them.

User defined fixed placement may include placement of the bubbles in fixed locations based on user selection. Such a configuration may include dividing the display into a grid, such as a one, two and/or three-dimensional grid having rows and columns, and placing the bubbles one at a time in a row and column location. Once a location is occupied, placement of a subsequent bubble may be limited or prevented. Bubbles may be placed in diagonals as well. Further, users may define a subset region of the display for placement of a bubble, for example. In such a configuration, a bubble may be confined to the upper left quadrant of the display, for example. Such confining may be combined with user-defined fixed placement, automatic fixed placement, and/or billiard ball physics, for example. Additionally, areas of the display may be reserved in certain configurations or embodiments for pre-defined types and/or sizes of bubbles, and changes in orientation may result in placement of icons in corresponding reserved areas based on the bubble attribute, for example.

Further, the automatic fixed placement on a grid, such as a one, two and/or three-dimensional grid, may be based, similarly to user defined fixed placement discussed above, on the nearest location of the bubble to a grid position and/or based on an attribute of the bubble, or on a zonal placement of certain types of bubbles, for example. Automatic placement may lock the bubble to a predefined configuration.

Figure 7:
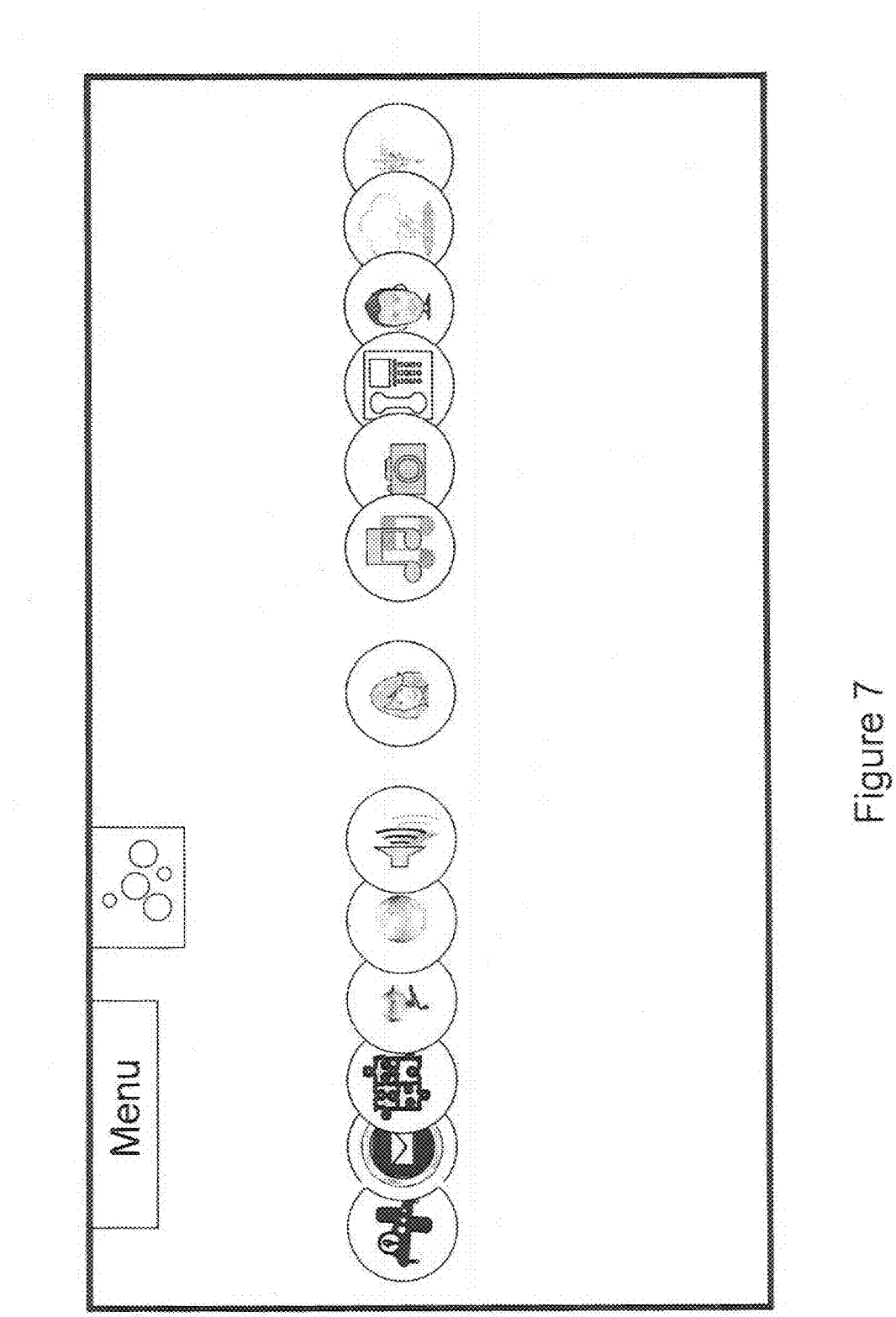
FIG. 7 illustrates an exemplary embodiment of the present invention.

In an embodiment of the present invention, the bubbles and objects may be organized and held static in various views, including that illustrated in FIG. 7. In this illustration, the bubbles are organized in a linear view and may be moved side to side by dragging any individual or series of bubbles from either left to right or right to left across the display. The bubbles may also be selected and activated as described more fully herein.

Figure 8:
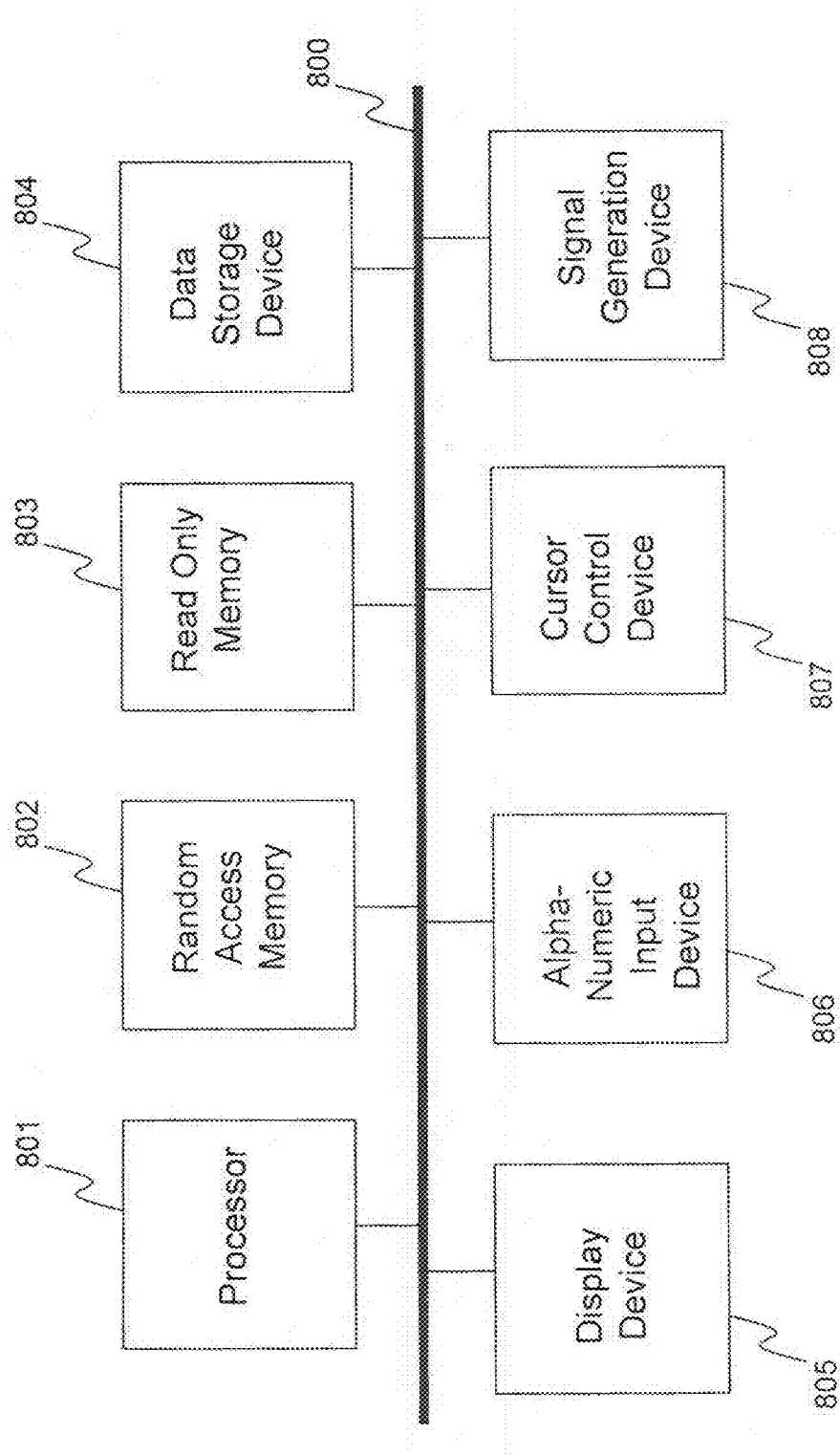
FIG. 8 illustrates an exemplary embodiment of the present invention.

Exemplary embodiments of the present invention may be implemented on various electronic systems including computers, dedicated computers or computing appliances, handhelds and cell phones, for example. However, it will be readily appreciated by those skilled in the art that GUI according to the present invention may be used in combination with any system having a processor and a display. In general, such systems, as illustrated in the exemplary block diagram form by FIG. 8, comprise a bus 800 for communicating information, a processor 801 coupled with the bus for processing information and instructions, a random access memory 802 coupled with the bus 800 for storing information and instructions for the processor 801, a read only memory 803 coupled with the bus 800 for storing static information and instructions for the processor 801, a data storage device 804 such as a magnetic disk and disk drive, flash memory or CD ROM drive coupled with the bus 800 for storing information and instructions, a display device 805 coupled to the bus 800 for displaying information to the computer user, a keyboard device 806 including alphanumeric and function keys coupled to the bus 800 for communicating information and command selections to the processor 801, a cursor control device 807 coupled to the bus for communicating information and command selections to the processor 801, and a signal generating device 808 coupled to the bus 800 for communicating command selections to the processor 801.

The display device 805 utilized with the computer system of the present invention may be a liquid crystal device, touch-screen, cathode ray tube, or other display device suitable for creating images and alphanumeric characters (and ideographic character sets) recognizable to the user. The cursor control device 807 allows the computer user to dynamically signal the two dimensional movement of a visible symbol (cursor) on a display screen of the display device 805. Many implementations of the cursor control device are known in the art including a trackball, mouse, joystick or special keys on the keyboard device 806 capable of signaling movement of a given direction or manner of displacement. It is to be appreciated that the cursor also may be directed and/or activated via input from the keyboard using special keys and key sequence commands. Alternatively, the cursor may be directed and/or activated via input from a number of specially adapted cursor directing devices, including those uniquely developed for the disabled. In the discussions regarding cursor movement and/or activation within the preferred embodiment, it is to be assumed that the input cursor directing device or push button may consist any of those described above and specifically is not limited to the mouse cursor device.

Further, it will be appreciated by those skilled in the art that neither the cursor control device 807 nor the keyboard device 806 are necessary if the display device 805 is a touch-screen sensitive device. In an embodiment of the present invention, the graphical user interface is operated through user interactions facilitated by a touch-screen enabled display device 805. Such functionality may allow for the use of the present invention using only a display and without the need for peripherals, such as a mouse or keyboard.

Figure 9:
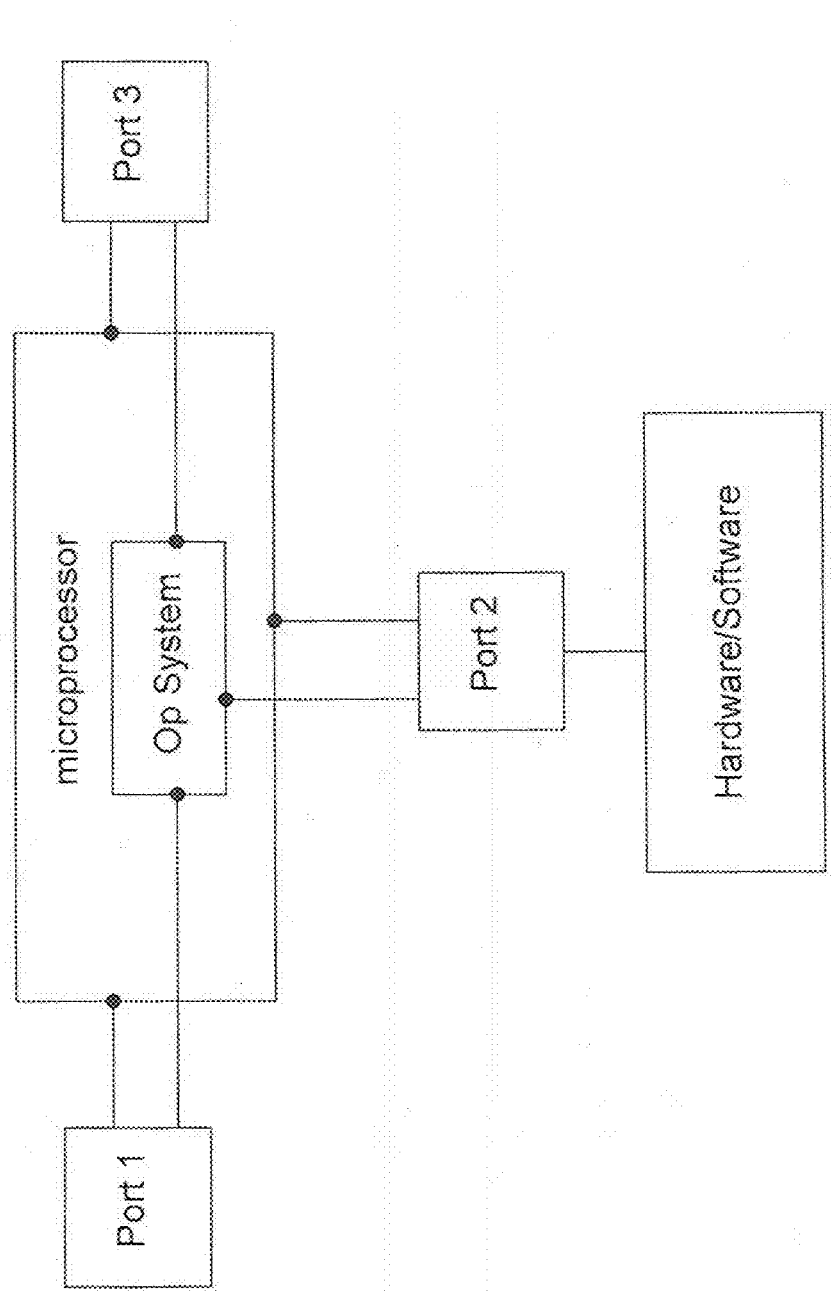
FIG. 9 illustrates an exemplary embodiment of the present invention.
Figure 10:
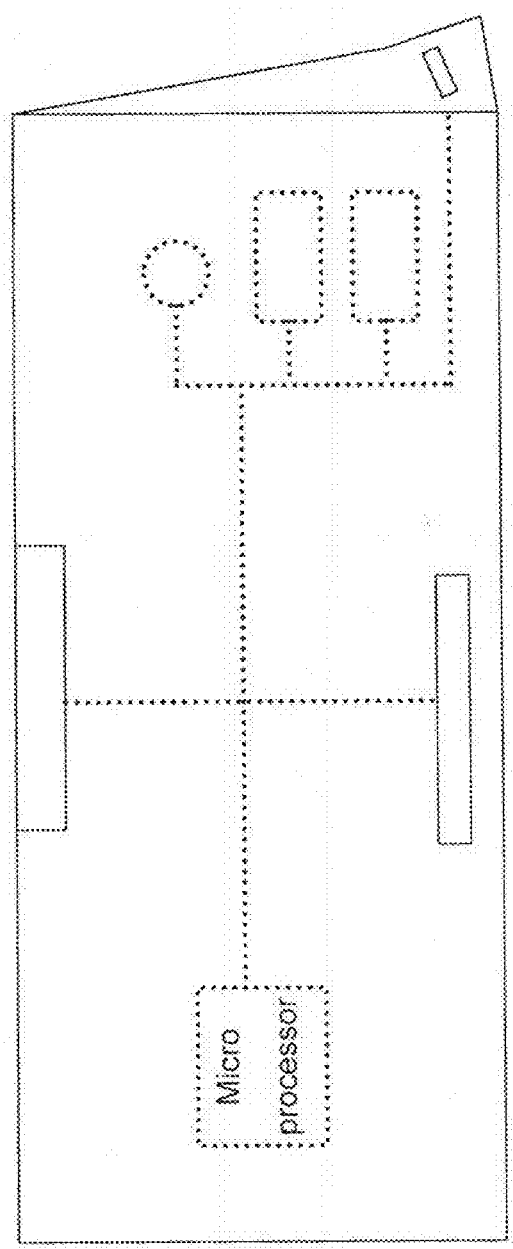
FIG. 10 illustrates an exemplary embodiment of the present invention.

As discussed in some measure above, the present invention may be used on a local and/or semi-local system. Systems that are not strictly local may include systems interconnected with use of at least one additional GUI and related peripherals. With reference to FIGS. 9 and 10, the present invention provides a GUI capable of driving the hardware, software, appliances, and peripherals desired to be driven by a user of any particular computing platform. For example, the present invention provides a GUI for a modular computing solution that may provide a computing solution that can be developed uniquely by each user for that user's life style profile. For example, modules may be added for use with a computing platform for which the present invention may provide access to the accessible applications and peripherals, such as internet computing, word processing computing, a set top box, a recipe system for use in a kitchen, or an iPod/MP3 player/radio for use by a swimming pool, by way of non-limiting example. Such myriad capabilities may be modularly provided to a base computing system and may be automatically served by the GUI.

For example, a base computing system may preferably provide an open platform for use with the present invention.

The base computing system may be, for example, a Windows or Linux based machine, and/or may employ open source software and platforming, and/or may thus provide an openware solution. Such an "open format" computer may provide only that functionality desired by the user in a base model computer. Thus, for example, as illustrated in FIG. 10, the computing device for use with the present invention at the base level may be provided with a plurality of USB, Ethernet, RCA, proprietary, Optical, and like inputs, into which may be connected any number of appliances, peripherals, software modules, and the like. Such input ports may include, for example, a hardware and software port at the top of the unit, in the center and facing upward and/or one or more, ports on the front, sides, bottom, back, and even on the stand for the unit, and/or a power port, for example. Any mix of types of such ports, and in any locations, may be provided. Further, an application may, in certain embodiments, entail provision of application software at one port of the present invention, and operation of application specific hardware correspondent to the application software at one or more other ports. Ports may, for the purposes discussed herein, be interchangeable as to what is applied to any given port in a particular application, and may not be interchangeable for the purposes of other application modules. Additionally, the unit may be enabled to operate for periods of time, or permanently, on one or more batteries, rather than a plug-in power supply.

More specifically, in an exemplary embodiment of the present invention, a user may purchase, inexpensively, such as for ninety-nine dollars, a base computing system. Resident on that base computing system may be the present invention functioning as, or along with, limited operating system software, such as Linux or Windows based operating system software, such as a thin client or thick client operating system. The operating system and/or GUI of the present invention may provide, upon implementation and/or purchase of the computer, no, or very limited, application functionality. However, the user may be enabled to add on application hardware/software modules to provide functional computing aspects for execution by the open operating system and for consolidation and access by the GUI.

The disclosure herein is directed to the variations and modifications of the elements and methods of the invention disclosed that will be apparent to those skilled in the art in light of the disclosure herein. Thus, it is intended that the present invention covers the modifications and variations of this invention, provided those modifications and variations come within the scope of the appended claims and the equivalents thereof.

What is claimed is:

1. A computer system comprising:
   a display;
   a graphical user interface rendered on the display, wherein the graphical user interface displays a plurality of objects representative of one or more computing functions, wherein the plurality of objects include a user object representative of a user;
   a processor that filters the plurality of objects based on a selection of the user object and varies a size of at least one of the plurality of objects based on a frequency of user interaction of the user with the at least one of the plurality of objects.

2. The computer system of claim 1, wherein the processor further varies a position of a first object of the plurality of objects that is proximate to one or more of a boundary of the graphical user interface and a second object of the plurality of objects.

3. The computer system of claim 1, wherein the user interacts with at least two of the plurality of objects.

4. The computer system of claim 3, further comprising a control device, wherein the control device facilitates the frequency of user interaction, and wherein the control device is one of a cursor and a touch-screen.

5. The computer system of claim 1, wherein the frequency of user interaction with the at least one of the plurality of objects increases a change in a position of the at least one of the plurality of objects.

6. The computer system of claim 1, further comprising at least one skin encompassing the at least one of the plurality of objects.

7. The computer system of claim 6, wherein the at least one skin facilitates the frequency of user interaction with the at least one of the plurality of objects.

8. The computer system of claim 6, wherein the at least one skin is approximately 1/32 to 1/4 inch thick.

9. The computer system of claim 1, wherein the at least one of the plurality of Objects enlarges based on the frequency of user interaction with the at least one of the plurality of objects.

10. The computer system of claim 9, wherein the at least one of the plurality of objects enlarges to a diameter of approximately 1-4 cm.

11. The computer system of claim 1, wherein a first object of the plurality of objects decreases in diameter based on a decreased frequency of user interaction compared to that of a second object of the plurality of objects.

12. The computer system of claim 11, wherein the first object of the plurality of objects decreases in the diameter to approximately 1/4-2.5 cm.

13. The computer system of claim 1, wherein the processor varies the size of the at least one of the plurality of objects based on an importance of the at least one of the plurality of objects.

14. The computer system of claim 1, wherein the at least of the plurality of objects corresponds to at least one associated space of the computer system.

15. The computer system of claim 14, wherein the at least one associated space comprises an office.

16. The computer system of claim 1, wherein the processor varies a position of the at least one of the plurality of objects based on billiard ball physics.

17. The computer system of claim 1, wherein the processor varies a position of the at least one of the plurality of objects based on one or more user defined fixed placements.

18. The computer system of claim wherein the processor varies a position of the at least one of the plurality of objects based on one or more automatic fixed placements.

19. A method, comprising:
   displaying at least one of a plurality of objects in a graphical user interface rendered on a display, wherein the plurality of objects include a user object representative of a user;
   filtering the plurality of objects based on a selection of the user object; and
   varying a size of the at least one of the plurality of objects based on a frequency of user interaction of the user associated with the user object with the at least one of the plurality of objects.

20. The method of claim 19, further comprising varying a position of a first object of the plurality of objects that is proximate to one or more of a boundary of the graphical user interface and a second object of the plurality of objects.

21. The method of claim 19, further comprising facilitating the frequency of user interaction using a control device, wherein the control device is one of a cursor and a touchscreen.

22. The method of claim 19, further comprising enlarging the at least one of the plurality of objects based on the frequency of user interactions with the at least one of the plurality of objects.

23. The method of claim 19, further comprising decreasing a diameter of a first object of the plurality of objects based on a decreased frequency of user interactions compared to that of a second object of the plurality of objects.

24. The method of claim 19, further comprising varying the size of the at least one of the plurality of objects based on an importance of the at least one of the plurality of objects.

25. The method of claim 19, further comprising varying a position of the at least one of the plurality of objects based on billiard ball physics.

26. The method of claim 19, further comprising varying a position of the at least one of the plurality of objects based on a user defined fixed placement.

* * * * *